March 11, 1958  N. R. BRYANT ET AL  2,826,626
ELECTRIC BATTERY
Filed Nov. 4, 1954
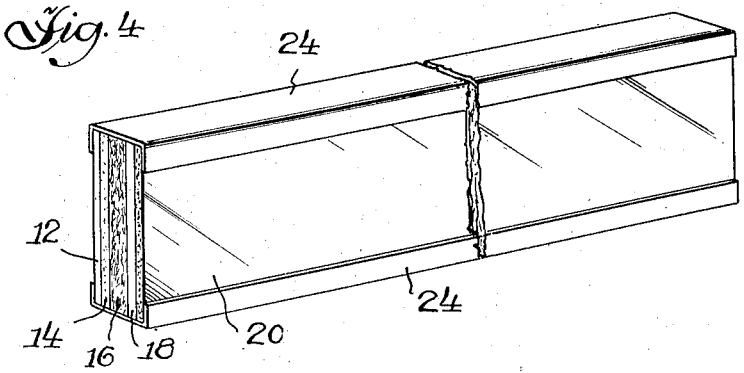
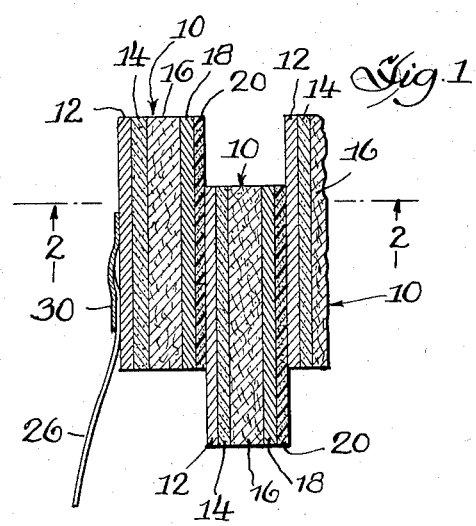
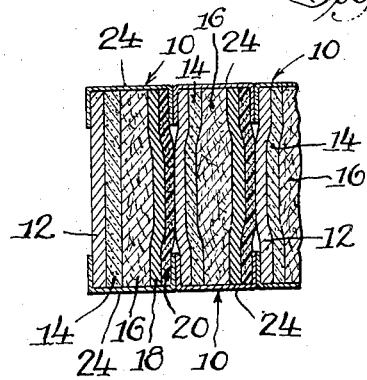
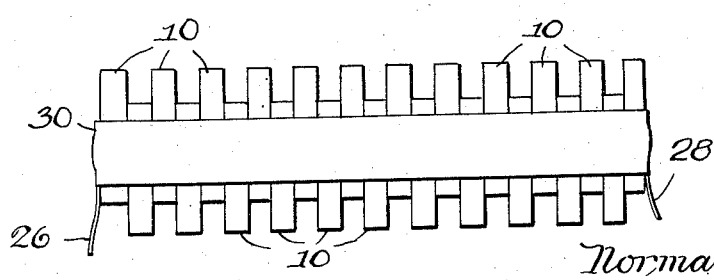
Inventors,
Norman R. Bryant
and Milton E. Wilke
By: Jones, Jesch & Darbo, Attys.

United States Patent Office 2,826,626
Patented Mar. 11, 1958

2,826,626

ELECTRIC BATTERY

Norman R. Bryant and Milton E. Wilke, Freeport, Ill., assignors to Burgess Battery Company, Freeport, Ill., a corporation of Delaware Application November 4, 1954, Serial No. 466,715

3 Claims. (Cl. 136—87)

This invention relates to electric batteries of the flat cell type, i. e., which are made up of a plurality of flat cell elements stacked together in juxtaposed relation and proper order to form a series-connected battery. In particular, the invention relates to the provision in such a battery of an anode electrode for the cells which has a non-metallic conductive sheet in adherent relation to one surface thereof, which sheet provides the series connection between the cell containing said anode and the adjacent cell. The invention also relates to the method of making such electrode with the conductive sheet in adherent relation thereto.

The invention is described and illustrated herein in connection with an electric battery of the deferred-action type which is activated by being brought into contact with a body of activating liquid. In batteries of this general type, the electrolyte-receptive elements absorb activating liquid and some of the latter clings to the exposed surfaces of the electrodes, tending to set up local action upon the exposed surfaces of the anodes, and to form short-circuiting bridges between the elements of different cells.

It is an object of the invention to provide in a deferred-action battery of the character described an electrode structure in which such local action and bridges are substantially avoided.

In the electric battery embodiment described herein, the electrolyte-receptive element is not in direct contact with the before-mentioned non-metallic conductive sheet but is separated therefrom by a metal conductive element. The anode of the invention with the adherent non-metallic conductive sheet is adapted for use with other battery constructions, such as are described in United States Patent 1,916,698, in which the electrolyte-receptive element is in contact with the non-metallic conductive sheet. In batteries of this latter type electrodes of the general character of that described herein have been used. Such electrodes have been formed by applying, as by brushing, spraying or dipping one or more layers of a conductive composition to the surface of the anode. The layer so formed sometimes is of uneven thickness and has minute pores or openings therein, as may be formed by the evaporation of solvent or otherwise, whereby it is not completely impervious. In such batteries, the anode is a component of one cell and the electrolyte-receptive element is a component of the adjacent cell, and the uneven thickness of the non-metallic conductive element and the openings therein result in non-uniform conductivity between cells and short circuits by direct contact of the electrolyte of one cell with the anode of the adjacent cell.

It is another object of the invention to provide in an electric battery, an electrode of the character described having a non-metallic conductive sheet in adherent relation thereto which is of uniform thickness throughout and is free of openings.

The objects are accomplished by providing in a battery of the character described an anode which has a premolded sheet of conductive plastic in adherent relation throughout its area to the surface thereof which is exteriorly of the cell of which it is the anode. The sheet is electrically conductive by reason of its being impregnated with conductive particles, and it provides series connection between the cell of which said anode is a component and the adjacent cell. The invention is directed particularly to electrode structure in which the anode is composed of magnesium, because with a magnesium anode it is difficult to employ metallic intercell connectors due to the fact that magnesium can be soldered or welded to such connectors only with great difficulty, and the non-metallic conductive elements provide a connector of great utility.

In the drawings,

Fig. 1 is a sectional elevation, on an enlarged scale of a portion of a battery which represents an embodiment of the invention;

Fig. 2 is a sectional view along line 2—2 of Fig. 1;

Fig. 3 is a side elevation of said embodiment; and

Fig. 4 is a perspective view of an elongated cell blank adapted to be cut to lengths to form a number of individual cells.

The embodiment which is illustrated is composed of a plurality of flat cell elements stacked in juxtaposed relation and proper order to form a battery of series-connected cells. The battery is of the deferred-action type and is adapted to be activated by being brought in contact, as by dipping, with a body of activating liquid. The ends of each cell are open to permit direct contact of the body of activating liquid with the cell elements, and to minimize short circuits between cells by activating liquid which may cling to the elements each successive cell is displaced laterally with respect to the last whereby the open ends of the different cells are separated by a substantial distance.

Each cell 10 is composed of elements, from left to right in Figs. 1 and 2, consisting of the positive terminal 12 of copper, the depolarizing cathode 14 of cuprous chloride, the electrolyte-receptive element 16 of a suitable absorbent paper, such as blotting paper, the anode 18 of magnesium, and the premolded conductive plastic sheet 20 which is in intimate adherent relation to the anode 18 throughout the area of the latter. The joined-together anode 18 and conductive sheet 20 will, for convenience, sometimes herein be called the anode member, and the associated terminal 12 and cathode 14 will sometimes be called the cathode member. Each cell is enclosed on two opposite sides thereof, as shown in Fig. 2, by electrolyte-impervious, flexible, dielectric strips or tapes 24, which may be composed of paper or cloth impregnated and coated on the exterior surface with lacquer, varnish, resin or the like, and coated on the interior surface with a pressure-sensitive adhesive. The strips 24 enclose and are adhesively attached to the edges of the cell elements and the marginal portions of the exterior surfaces of the terminal member 12 and the conductive sheet 20, leaving the major portions of the exterior surfaces of elements 12 and 20 exposed throughout their lengths. The other two sides of the cell which, for convenience, will be called the ends of the cell, are exposed to the surrounding space and are brought in direct contact with the body of activating liquid during the activating operation.

The desired number of cells 10 are arranged in juxtaposed relation, with each succeeding cell displaced or offset laterally (of the battery) in the opposite direction as shown in Figs. 1 and 3 until a battery having the desired voltage is produced. A terminal conductor 26 is connected as by soldering to the terminal 12 of one end cell, and a copper terminal (not shown) similar to terminal 12 is placed against the conductive sheet 20 of the other end cell and connected to the other terminal conductor 28 of the battery. The assembly of cells is then compressed longitudinally to bring all of the cells and the elements thereof into firm pressure contact with one another, and the assembly is encircled longitudinally with the band or tape 30. Said tape has a pressure sensitive adhesive upon its interior surface and holds the assembled battery firmly together, as indicated in Fig. 3. The elements of the battery are flexible and readily bent and the elements 16 are compressible as is illustrated in Fig. 2, and during the longitudinal compression of the battery the elements thereof bend or flex and the absorbent elements 16 are compressed, whereby the two thicknesses of the edge enclosing strips 24 are accommodated and the terminal 12 and conductive sheet 20 of two adjacent cells are brought in firm pressure conductive contact with each other and the cells are connected together in series. The thickness of the elements is greatly exaggerated in Figs. 1 and 2 since in actual practice, the terminal 12 and anode 18 are of foil thickness. A deferred-action battery having a staggered succession of cells is disclosed in United States Patent No. 2,637,756.

The embodiment which has been described is by way of illustration and not of limitation and changes therein may be made as will occur to those skilled in the art. For example, the depolarizing cathode 14 may be composed of silver chloride instead of cuprous chloride, and the terminal 12 may be composed of silver instead of copper, or it may be composed of any suitable conductive metal which is not substantially electronegative with respect to the depolarizing cathode.

In accordance with usual practice with deferred-action batteries, the battery herein described is initially manufactured in the electrolyte-free condition, and when it is desired to place the battery in operation the open ends of the cells 10 are brought into contact with a body of activating liquid whereby such liquid is absorbed by the electrolyte-receptive elements 16, which liquid then becomes the electrolyte of the cells and renders the battery operative. With the batteries which have been described, a suitable activating liquid is plain water, the salt water of the sea, or a dilute aqueous solution of a suitable salt, an example being a solution of sodium chloride containing up to 5 percent of NaCl, based on the weight of the solution.

It has been explained that the conductive plastic sheets 20 provide electrical connection between the anode 18 of one cell and the terminal 12 of the adjacent cell to thereby provide series connections for the battery. In addition to providing series connection, in the battery described herein, the conductive sheet 20 is a protective cover for the broad exterior surface of anode 18 which is exposed to the activating liquid during the activating operation and it thereby protects the anode against local action and also against bridging of activating liquid between said anode and the elements of the cell adjacent to said anode, thereby preventing the creation of energy dissipating voltaic couples and short circuits between different cells of the battery.

In forming the anode member 18—20, the plastic sheet 20 is first molded and then is adhesively united with the anode sheet material. A suitable moldable elastomeric or rubber-like plastic is used, examples of which are polyisobutylene and the synthetic rubbers. Into the plastic material is incorporated particles of conductive substance such as conductive carbon, examples of which are graphite and thermal acetylene black. Silver particles may also be used if desired. The particles are incorporated in the plastic while the latter is in a soft condition as by the application of heat, and they are thoroughly distributed throughout the volume of the plastic by a mixing or kneading operation. Thereafter, the plastic with the conductive particles incorporated therein is molded in the form of a thin sheet by means of heat and pressure, as by rolling it between cooperating heated pressure rolls. In this way, a sheet of uniform thickness and free of minute openings is produced. Such sheet is of substantial size, sufficient to form a large number of anode coverings. The conductive plastic sheet is then applied to a magnesium sheet of similar dimensions. For this operation, a surface of the magnesium sheet is cleaned by buffing or otherwise of foreign substances or oxidation products. A solvent for the plastic is applied to one surface thereof, as by wiping the surface of the plastic sheet with a cloth moistened with the solvent, brushing or spraying the solvent against the sheet, etc., the amount of solvent being controlled so as to produce a soft and tacky condition at the surface of the sheet. Examples of suitable solvents for the purpose are carbon tetrachloride, methylene chloride, ethylene dichloride and the like. While the surface of the plastic sheet is in the tacky condition, it is compressed against the cleaned surface of the magnesium sheet, as by means of a pair of cooperating press rolls, and an intimate adhesive union is formed between the two sheets throughout the area thereof. The result is a firm and permanent adhesive junction between the two sheets throughout the area thereof.

As has been stated hereinbefore, the magnesium and plastic sheets are joined together while in the form of sheets of large dimensions, which are then cut to smaller size for use as the electrode member 18—20. A method which is used in practice is illustrated in Fig. 4. The composite magnesium-plastic sheet is cut into the form of an elongated strip, and the other elements of the cell are also cut into the form of elongated strips of similar dimensions. The elongated strips are then stacked together in the same order as are the elements of a cell, and the stack is compressed so as to bring the elements into the proper pressure engagement with one another. While so pressed together, elongated strips of the adhesive-coated tape 24 are folded about the elongated edges of the strips and the marginal portions of the broad surfaces of the facing elements and the tapes are pressed into position to hold the stack firmly together. The result is an elongated cell blank, which is cut into sections of the proper length to form the individual cells.

In the battery embodiment which has been described and illustrated, the conductive plastic sheet 20 is not in direct contact with an electrolyte-receptive element 16, but as has been stated hereinbefore, the composite anode member 18—20 is adapted for use in batteries of a construction such that the sheet 20 is in direct contact with the electrolyte receptive element of the cell adjacent to the cell of which the anode 18 is a component, an example of such a battery construction being that disclosed in United States Patent No. 1,916,698. Such a battery is not of the deferred-action type and the electrolyte-receptive element of one cell is in direct contact with the non-metallic conductive sheet which is attached to the anode of the adjacent cell. In such construction, with the non-metallic elements known heretofore there is the tendency toward non-uniform thickness of the element and the presence of tiny openings. Such an element provides non-uniform conductivity between cells and also permits direct access of the electrolyte of one cell to the anode of the adjacent cell with accompanying local action at the anodes, energy-dissipating voltaic couples between the anode of one cell and the elements of the cell adjacent to said anode and short circuits between cells. Such objections are overcome with the conductive sheet 20 disclosed herein, because it has been accurately premolded before it is joined to the anode, and is of uniform thickness and free of openings.

Invention is claimed as follows:

1. In a deferred-action battery comprising a plurality of flat cell elements in juxtaposed relation and proper order to form a battery of series-connected cells, each of said cells having a sheet-form cathode and a sheet-form magnesium anode, a premolded sheet of conductive elastomeric plastic in adherent relation to the surface of said anode remote from said cathode throughout the area of said anode, said sheets of conductive plastic providing series electrical connection between adjacent cells of said battery.

2. In a deferred-action battery comprising a plurality of flat cell elements in juxtaposed relation and proper order to form a battery of series-connected cells, each of said cells having a sheet-form cathode and a sheet-form magnesium anode, a premolded sheet of polyisobutylene impregnated with conductive particles in adherent relation to the surface of said anode remote from said cathode throughout the area of said anode, said polyisobutylene sheet being conductive and providing series electrical connection between adjacent cells of said battery.

3. A deferred-action battery adapted for energization by contact with a body of activating liquid, comprising a plurality of flat cell elements arranged in juxtaposed relation and proper order to form a battery of series-connected cells, each cell comprising a sheet-form magnesium anode and a sheet-form cathode member and an electrolyte-receptive element between said anode and said cathode member, and a premolded sheet of conductive plastic in adherent relation to the surface of said anode remote from said cathode throughout the area of said anode, said sheet and said cathode member forming the faces of said cell, in each cell a substantially electrolyte-impervious flexible dielectric covering upon only the two opposite side edges and the marginal portions of said faces and leaving the remaining edges of the cell and the major portions of said faces free of said covering, said sheets of conductive plastic providing series electrical connection between adjacent cells, said arrangement inhibiting local action at the anodes and bridging of electrolyte between the anode of one cell and the elements of the adjacent cell.

References Cited in the file of this patent

UNITED STATES PATENTS

| | | |
|---|---|---|
| 2,572,017 | Ellis | Oct. 23, 1951 |
| 2,637,756 | Coleman et al. | May 5, 1953 |
| 2,684,397 | Gottschall | July 20, 1954 |
| 2,686,214 | Arbogast | Aug. 10, 1954 |
| 2,699,461 | Wilke | Jan. 11, 1955 |